(12) United States Patent
Byrd et al.

(10) Patent No.: US 8,644,488 B2
(45) Date of Patent: Feb. 4, 2014

(54) SYSTEM AND METHOD FOR AUTOMATICALLY GENERATING ADAPTIVE INTERACTION LOGS FROM CUSTOMER INTERACTION TEXT

(75) Inventors: Roy J. Byrd, Ossining, NY (US);
Stephen Carl Gates, Redding, CT (US);
Mary S. Neff, Montrose, NY (US);
Youngja Park, Edgewater, NJ (US);
Wilfried Teiken, White Plains, NY (US)

(73) Assignee: Nuance Communications, Inc., Burlington, MA (US)

( * ) Notice: Subject to any disclaimer, the term of this patent is extended or adjusted under 35 U.S.C. 154(b) by 1039 days.

(21) Appl. No.: 12/428,947

(22) Filed: Apr. 23, 2009

(65) Prior Publication Data

US 2010/0104087 A1    Apr. 29, 2010

Related U.S. Application Data

(60) Provisional application No. 61/108,596, filed on Oct. 27, 2008.

(51) Int. Cl.
*H04M 3/00* (2006.01)
*H04M 5/00* (2006.01)
*H04M 1/64* (2006.01)
*H04M 11/00* (2006.01)
*G06F 17/00* (2006.01)
*G06F 17/27* (2006.01)
*G10L 21/00* (2013.01)
*G10L 25/00* (2013.01)

(52) U.S. Cl.
USPC ............... 379/265.02; 379/88.01; 379/88.13; 379/265.01; 379/265.09; 704/9; 704/275; 715/257

(58) Field of Classification Search
USPC ............................... 379/265.01–266.1
See application file for complete search history.

(56) References Cited

U.S. PATENT DOCUMENTS

| 6,973,428 | B2 | 12/2005 | Boguraev |
| 7,184,539 | B2 | 2/2007 | Colson |
| 2002/0087321 | A1* | 7/2002 | Watanabe et al. ............ 704/270 |
| 2004/0162724 | A1* | 8/2004 | Hill et al. ...................... 704/231 |
| 2004/0254904 | A1* | 12/2004 | Nelken et al. .................. 706/50 |

(Continued)

OTHER PUBLICATIONS

Tang, et al, "Call-Type Classification and Unsupervised Training for the Call Center Domain", ASRU 2003, pp. 204-208, IEEE 2003.
Mishne, et al, "Automatic Analysis of Call-center Conversations", CIKM Oct. 31, 2005, pp. 453-459, ACM 2005.

(Continued)

*Primary Examiner* — Khai N Nguyen
(74) *Attorney, Agent, or Firm* — Hamilton, Brook, Smith & Reynolds, P.C.

(57) ABSTRACT

A system and method for providing an adaptive Interaction Logging functionality to help agents reduce the time spent documenting contact center interactions. In a preferred embodiment the system uses a pipeline comprising audio capture of a telephone conversation, automatic speech transcription, text normalization, transcript generation and candidate call log generation based on Real-time and Global Models. The contact center agent edits the candidate call log to create the final call log. The models are updated based on analysis of user feedback in the form of the editing of the candidate call log done by the contact center agents or supervisors. The pipeline yields a candidate call log which the agents can edit in less time than it would take them to generate a call log manually.

19 Claims, 10 Drawing Sheets

(56) References Cited

U.S. PATENT DOCUMENTS

| | | | |
|---|---|---|---|
| 2005/0010411 A1 | 1/2005 | Rigazio | |
| 2005/0114379 A1* | 5/2005 | Lee | 707/102 |
| 2007/0127688 A1 | 6/2007 | Doulton | |
| 2007/0198323 A1* | 8/2007 | Bourne et al. | 705/10 |
| 2007/0203869 A1 | 8/2007 | Ramsey | |
| 2007/0208579 A1* | 9/2007 | Peterson | 705/1 |

OTHER PUBLICATIONS

Bangalore, et al, "Learning the Structure of Task-driven Human-Human Dialogs", Proc. of 21st ICCL, Jul. 2006, pp. 201-208, ACL 2006.

Byrd, et al, "Semi-Automated Logging of Contact Center Telephone Calls", CIKM, Oct. 2008, ACM 2008.

* cited by examiner

SYSTEM AND METHOD FOR AUTOMATICALLY GENERATING ADAPTIVE INTERACTION LOGS FROM CUSTOMER INTERACTION TEXT

FIELD OF THE INVENTION

The invention relates to contact center interaction logs and more particularly relates to automatic adaptive creation of logs for customer interactions including telephone calls, on-line chat, and e-mail.

BACKGROUND OF THE INVENTION

Modern businesses use contact centers as a communication channel with users of their products and services. In recent years, contact centers have grown in importance as an interface of an organization to its customers, both existing and new. A customer's experience with the contact center is seen as a factor in customer retention, as well as an opportunity to sell more to existing customers (cross-sell, up-sell) and to sell to new customers. The largest factor in the expense of running a contact center is the labor cost of its customer service agents.

In most contact centers, every interaction (e.g., call, chat session, e-mail or written letter) with a customer service agent has to be documented in an interaction log. Such a log can be for one or more purposes, such as to support later continuation of the same customer interaction by different agents as well as the same agent, to support transfer of the case to another agent, or to provide legally-mandated documentation of the interaction. Agents may variously create logs during the interaction, while the customer is on hold (if a phone interaction), or immediately after the interaction is completed. Time spent for logging is typically tracked by contact center management in order to identify and improve upon inefficiencies.

Many contact centers use a customer relationship management (CRM) system to maintain customer interaction information, including the interaction logs. An agent may create the log directly, or make notes in a text editor on an agent computer during the interaction and then transfer the information into a CRM record with cut-and-paste operations. A typical CRM record consists of a collection of fields, called a "template," containing data to identify the customer and the customer's purchased item. In an example automobile provider/service environment, the CRM record might contain template fields for the make, model and VIN (vehicle identification number) of the customer's vehicle, owner information such as name, telephone number, and warranty status, and at least one open-input field for free-form documentation including such information as the customer's statement of the problem, relevant facts gathered from the customer (e.g. dealer, repair shop), and the agent's resolution of the customer's problem (e.g., gave rebate on repair cost). The free-form documentation together with the template fields is referred to as a log (or call log if the interaction is via a telephone).

While the free-form documentation is text, it is often quite irregular, characterized by idiosyncratic abbreviations, misspellings, missing words, grammatical errors, and incorrect case. The agent's goal is speed and completeness of documentation, not readability. Due to agent haste and errors, interaction logs often do not consistently capture appropriate and accurate information. Hence, automated or semi-automated creation of contact center interaction logs is desirable for at least two reasons: (1) it can potentially save contact centers money (by reducing the time spent creating the logs) and (2) it can improve the quality of the logs by creating less error-prone and more consistent documentation.

Related systems for summarizing speeches or dialogues in other environments are well known. For example, summarization of speech has been employed for broadcast news and voice mail. For broadcast news, approaches range from ones derived largely from text summarization to strategies combining prosodic, lexical, and structural features to other approaches having exclusive reliance on acoustic/prosodic features. In dialog summarization, a related application of summarization, prior art approaches rely on tf/idf (term frequency/inverse document frequency) scores, tempered with cross-speaker information linking and question/answer detection. While contact center interaction logging is similar to dialogue summarization, there are notable differences. First, the summarization of contact center interactions is highly dependent on the particular terms of interest in the industry or even the company represented by the contact center; for example, a VIN is a critically important item in a car manufacturer's interaction log. Hence, automated production of contact center logs requires the use of industry- or company-specific terminology. Second, contact center interactions are often highly scripted (i.e., follow prescribed patterns or business processes for dealing with the customers) and particular details of the scripted process need to be reflected in the log (e.g. agent asking for phone number or credit card number). Hence, unlike general open-domain dialogue summarization, which needs only to determine domain salience statistically, contact center log generation needs to identify important items from the scripted process in the interaction and attach semantic labels to information required by the script to route identified items into the correct fields of the CRM record. Third, because contact center managements often develop best practices for creating logs, and these best practices may again be industry- or company-specific, automated log creation must reflect those best practices. And fourth, because the environment in contact centers can change rapidly to reflect changing products, customer issues, customer buying patterns, advertising campaigns and even world events, the system for creating the contact center logs must adapt over time; hence, feedback systems are desired to ensure continued adaptation of the system.

A common method for creating adaptive systems is to create models, which may be thought of as sets of rules or patterns for creating the desired type of output (log in this case) from a given input (here, the text of the full interaction). In the present invention, two different types of models are described: a global model which contains the sets of rules and patterns to be applied across all logs created by the system, and a real-time model, which affects the creation of only the log for the current interaction. Some elements of the global model may, if desired, be considered fixed; such that they can not be overridden by user feedback. Non-fixed elements for both types of models can preferably be updated based on feedback from users of the system; hence the models "learn" or adapt as the system is used. The real-time model is updated during the analysis of an individual call, whereas the global model is updated after one or more calls have been completed.

It is an object therefore of the present invention to provide a system and method for automatically and adaptively (using feedback) generating a log from the interaction text of an interaction between a customer and the contact center agent that meets changing requirements for contact center logs.

SUMMARY OF THE INVENTION

The present invention provides a system and method for automatically and adaptively creating logs for contact center interactions to help agents reduce the time they spend documenting the interactions. A preferred embodiment is described to create logs from a specific type of interaction, namely telephone calls. It uses an analysis pipeline comprising audio capture of a telephone conversation, transcript generation using an automatic speech recognition (ASR) system, transcript normalization, and call log generation using predefined models of what a "good" call log will be, as described below.

The transcript normalization in a preferred embodiment consists of advanced transcript text cleansing, including normalization of expressions and acronyms, domain terms, capitalization, and boundaries for sentences, paragraphs, and call segments; the normalization facilitates correct generation of the transcript and resulting call log. Text derived from non-speech sources may also require spelling correction as part of the normalization. The call log is produced from the normalized transcript by applying both a real-time and a global model to determine which elements of the transcript will be used in the log. The resulting candidate call log is displayed for agent review and editing and the resulting final call log is then stored into the CRM system. In addition, the results from that review are used in a feedback system to improve the underlying real-time and global models used by the call log generation process. In practice, implementation of a preferred embodiment yields a candidate call log which the agents can review in less time than it would take them to generate a call log manually, and the computer-generated and human reviewed logs are more accurate and of more appropriate level of detail than manually-generated logs. Hence, the invention described here not only saves agent time but also produces better results than a fully manual process.

BRIEF DESCRIPTION OF THE DRAWINGS

The invention will be described in greater detail below with specific reference to the appended drawings in which.

DETAILED DESCRIPTION OF THE INVENTION

In the ensuing description, reference will be made to spoken communications at a contact center. It should be understood that additional communications may include written communications (e.g., from e-mail, on-line chat, agent text entry at a contact center computer, user text entry at a web page or PDA, etc.), selection of predefined inputs on a computer-displayed form, or from a combination of spoken and otherwise-input communications. Communications that are in textual form already will not require processing by the call recording and speech transcription components of the preferred embodiment described below.

Under the present invention, a system and method for producing contact center logs or summaries of a communication in a contact center environment is described. The system of a preferred embodiment consists of a pipeline comprising audio capture of a telephone conversation, automatic call transcript generation, text normalization of the call transcript, and log generation based upon one or more models. The pipeline yields a candidate log which the agents can edit in less time than it would take them to generate a log manually. A feedback system then uses the computer-generated but human edited log to update one or more models in an iterative fashion.

Figure 1:
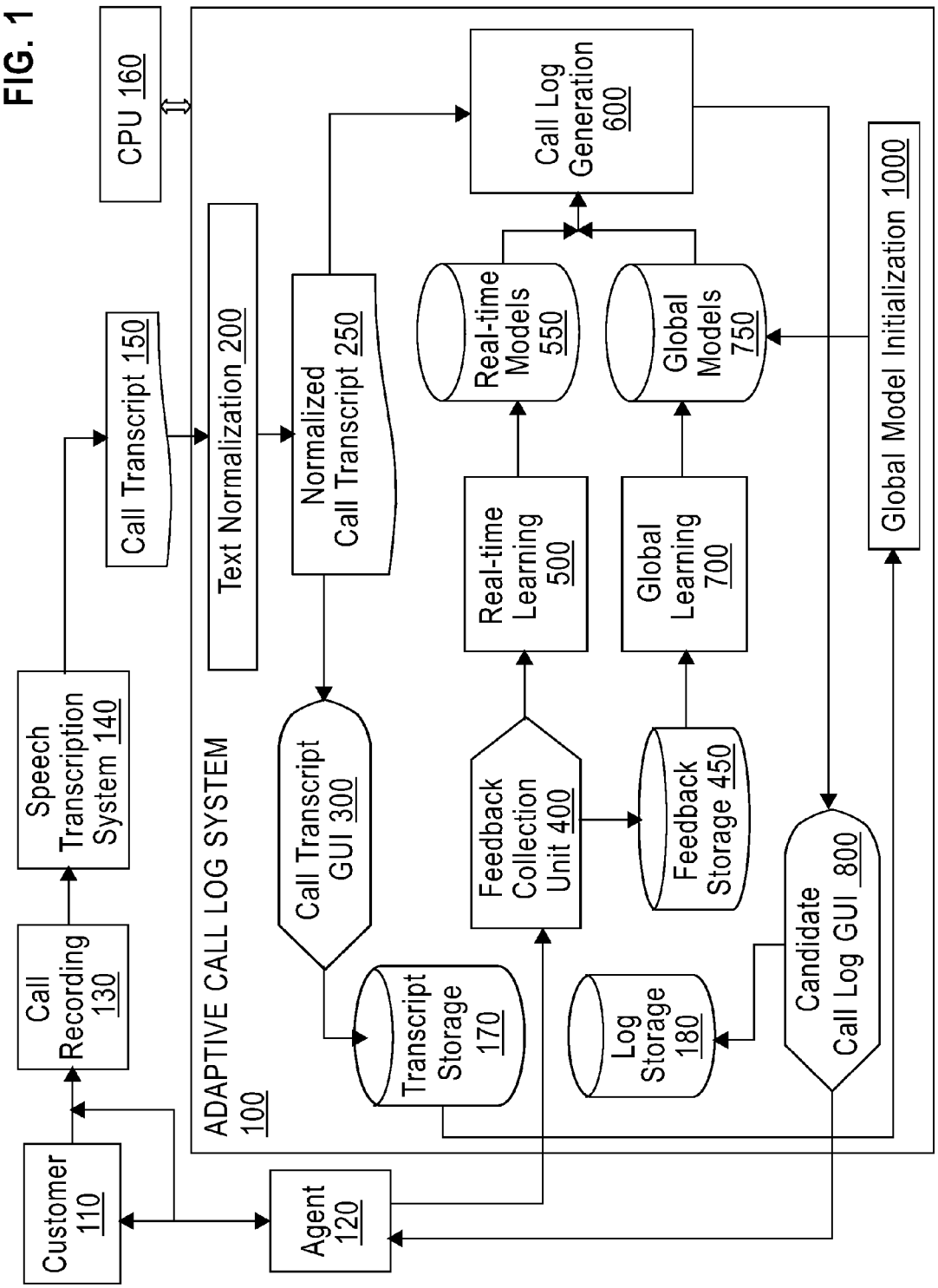
FIG. 1 is a block diagram depicting a system for implementing the present invention.

FIG. 1 illustrates a system for an implementation of the present invention for contact center interactions via a telephone. Communications between a customer, at location 110, and a contact center agent, at 120, are input to a call recording system 130. Any of numerous commercial call recording systems can be used; however, a system employing dual-channel recording allows separation of the speech records of the two speakers and appears to give superior results compared to single-channel recording. As the call proceeds, the recorded call is then input to a commercially-available speech transcription system, 140. The transcribed speech is next sent to the Adaptive Call Log system 100 for processing. It is to be noted that the components of the Adaptive Call Log system 100 can be implemented in hardware or software. Insofar as components are implemented in software, at least one CPU 160 which is associated with or part of the Adaptive Call Log system executes the respective components in parallel or serially as needed. Within the Adaptive Call Log system 100, the transcribed speech, hereinafter referred to as the Call Transcript 150 is first sent for Text Normalization 200. Text normalization will be described in further detail with reference to FIG. 2 below. The Normalized Call Transcript 250 from the beginning of the call to the current point in time (hereinafter referred to as the "present call transcript") is then provided to a Call Transcript GUI (Graphical User Interface) component 300 and to the Call Log Generation component 600. The Call Transcript GUI component 300 displays the present call transcript at the agent's computer. In a preferred embodiment, displaying the transcript in real-time allows the agent to edit the transcript, for instance, correcting incorrectly-recognized words. Displaying the transcript in real-time also allows the agent to determine the quality of the transcript and to use manual logging if the quality of the transcript is too low.

In another embodiment, an automated system can determine the quality of an automatically generated transcript, and send a warning to the agent if the quality is too low, so that the agent can create a log manually. Since the system is receiving new spoken input in real-time, the automatic speech recognition and text normalization can be done continuously on the input stream. In another embodiment, the input stream can be stored to a specified point in the conversation (e.g., until the amount of text reaches a threshold amount or until expiration of a preset time period) and then processed. The Text Normalization component 200 will generate a new version of a present call transcript and refresh the display to the agent each time a new version is generated. The present call transcript provided to the Call Log Generation component 600 is processed to generate the candidate call log, as further detailed below with reference to FIG. 3.

The Call Log Generation component 600 has access to one or more Real-time Models stored at 550 as well as to one or more Global Models stored at 750 to assist in identifying which of the utterances in the call transcript is significant for the present call transcript and which should, therefore, be included in the candidate call log. The Global Models are initially created with human-generated call logs by the Global Model Initialization component 1000, as further detailed below with reference to FIG. 5. The candidate call log is sent to a Candidate Call Log GUI component 800 for displaying the candidate call log to the agent computer 120 and may optionally be stored in the Log Storage component 180 at this time as well.

The agent, while viewing both the present call transcript and the candidate call log, can provide feedback to a Feedback Collection Unit 400. In a preferred embodiment, the Feedback Collection Unit 400 receives word correction feedback from the Call Transcript GUI component 300 and log correction feedback from the Candidate Call Log GUI component 800. Real-time Learning Component 500 receives the agent feedback from the Feedback Collection Unit 400 and generates and/or updates the Real-time Models, shown at 550. The agent feedback is also provided for storage at a Feedback Storage location 450. The Feedback Storage can be accessed at any time by a Global Learning component 700 for generation and updating of the Global Models, shown at 750. The details for using agent feedback for generation of Real-time and Global models are further detailed below.

When a call is completed, the call transcript for the entire conversation is stored in the Transcript Storage 170, and the final call log is stored in the Log Storage 180.

Figure 2:
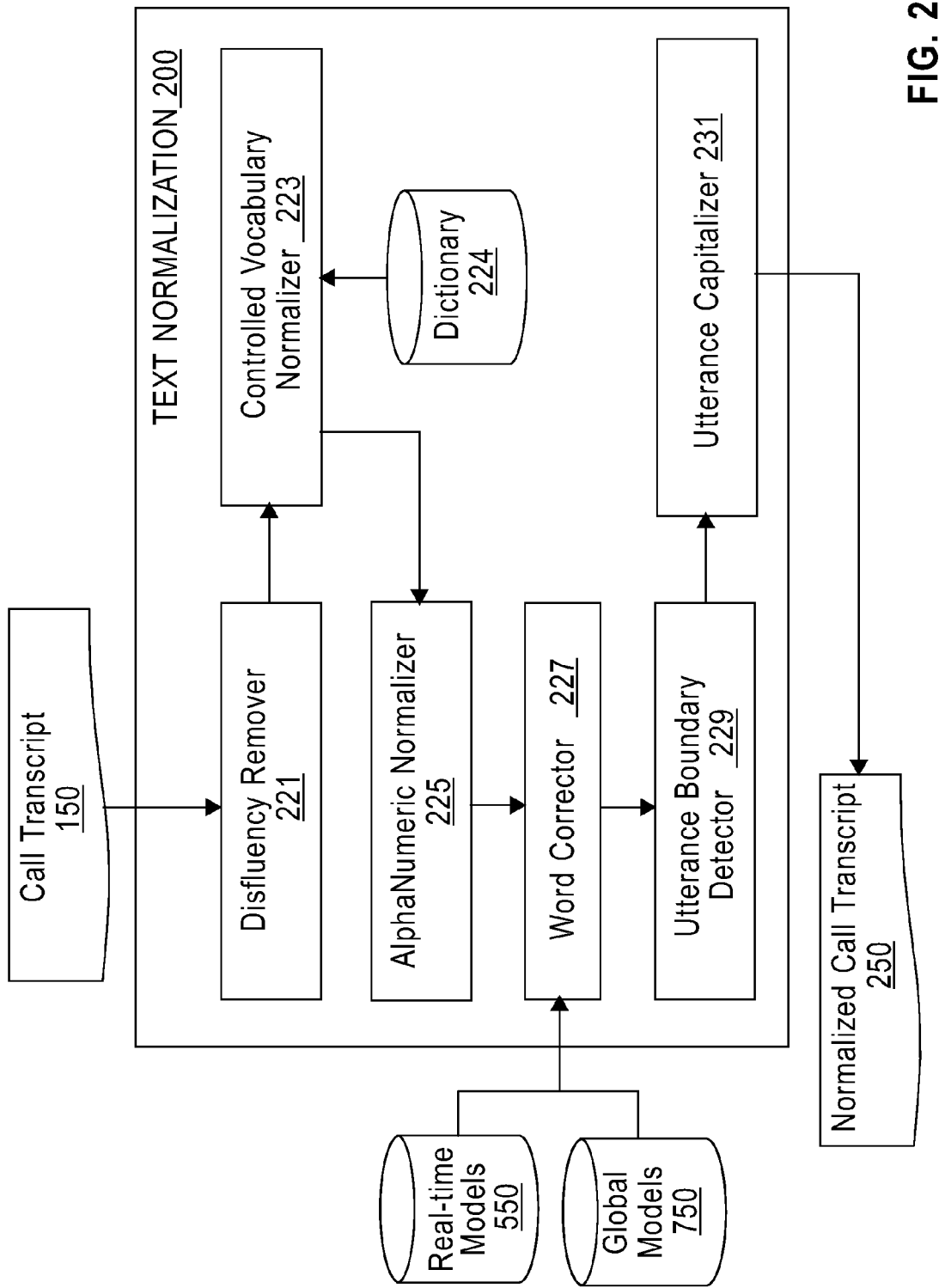
FIG. 2 is a block diagram illustrating representative subcomponents for the Text Normalization component in accordance with the present invention.

FIG. 2 illustrates the process flow implemented by the Text Normalization component 200. The Call Transcript 150 generated by the Speech Transcription System component 140 in FIG. 1 is input to the text normalization process. Its goal is to convert the output of the Speech Transcription System component 140, which typically consists of a string of word/time pairs all in upper case with no punctuation or sentence boundaries, into something resembling normal written text, both for ease of display to the agent and to enable more accurate analysis in subsequent steps. The text normalization can consist of many different types of processing; in a preferred embodiment, it begins at Disfluency Remover 221. Component 221 removes disfluencies such as "um" or "er" that are found in the recognized speech. A Controlled Vocabulary Normalizer component 223 replaces recognized domain terms, such as proper names, with their capitalized forms with reference to Dictionary 224. An AlphaNumeric Normalizer 225 replaces groups of number words with digits, groups of letter names with acronyms, and groups of number and letter words with alphanumeric strings (e.g., "nine one one" becomes "911", and "I B M" becomes "IBM"). The Word Corrector 227 corrects incorrectly recognized words in the call transcript based on the agents' feedback stored in Global Models and Real-time Models. The Real-time and Global models will be described in further detail with reference to FIG. 4 and FIG. 7 below respectively. In a preferred embodiment, the word corrections made by the agents are captured by the Feedback Collection Unit 400. The word correction feedback contains the incorrectly-recognized word, the correct word, and the context (typically a several-word snippet of text) the incorrectly-recognized word appears in. The Word Corrector replaces all other occurrences of the incorrectly-recognized words with the correct words in the rest of the call transcript if the contexts are the same or very similar. The Utterance Boundary Detector 229 determines utterance boundaries (where utterances are units of speech by a single speaker, bounded by silences) and adds periods to the ends of utterances. One embodiment of the utterance boundary detection is described in a related application "System and method for automatic call segmentation at call center" (Ser. No. 12/257,037 filed Oct. 23, 2008). The Utterance Capitalizer 231 capitalizes the first word in each utterance. Algorithms for performing utterance capitalization are well known to those skilled in the art of text analytics. It will be understood that certain aspects of the text normalization can be done out of the sequence shown without adversely affecting the output. A processed call transcript, herein referred to as the Normalized Call Transcript 250, is output from the Text Normalization component 200 and provided to the Call Transcript GUI component 300 and to the Call Log Generation component 600 in FIG. 1.

Figure 3:
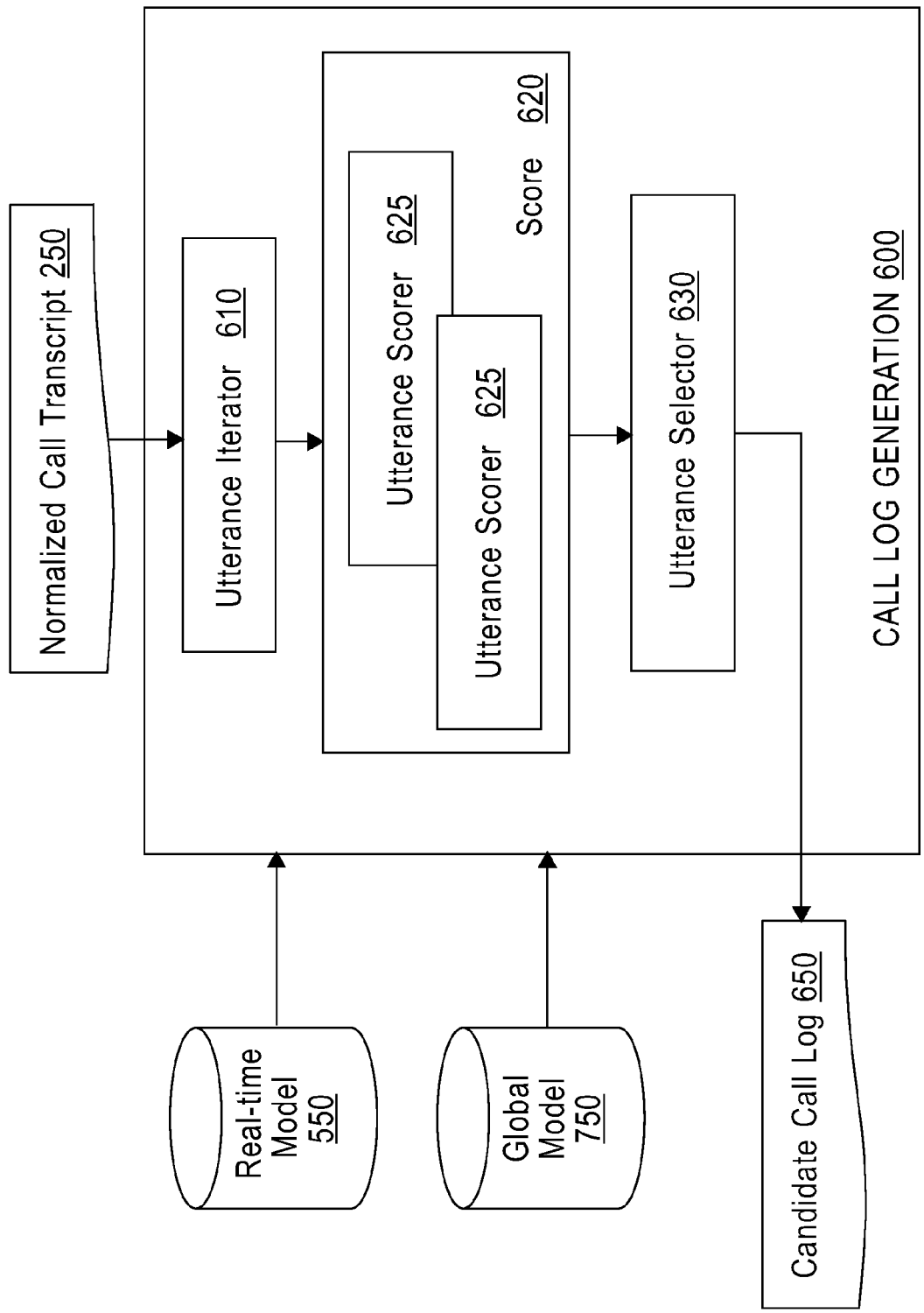
FIG. 3 is a block diagram illustrating representative subcomponents of the Log Generation component in accordance with the present invention.

FIG. 3 shows details of the Call Log Generation Component 600 which receives the Normalized Call Transcript 250 and creates a Candidate Call Log 650 from it. From the normalized call transcript, an Utterance Iterator 610 considers each utterance one by one. A set of Utterance Scorers 625 in the Score component 620 scores each utterance using the Global Models 750 and the Real-time Models 550. The Utterance Selector 630 decides which utterances will be used in the log, based on the scores assigned by the Utterance Scorers. In a preferred embodiment, the N utterances with the highest scores are used, where N is specified by the Global Model. In addition, in one embodiment, the Utterance Selector combines the scores based on the Real-time and Global models in a simple additive fashion. In a preferred embodiment, the scores from the application of the Global Model are used preferentially over the scores from the Real-time Model in those cases where conflicting rules are used in the two models, but alternatively, the scores can be combined additively. In another embodiment, one or both of the models may contain rules which specify the order or formatting of the utterances (e.g., the Utterance Selector may be instructed by the Models to place template information first as part of the log, and then omit that information when it would otherwise occur later in the log). The results from the Utterance Selector are then used to create the Candidate Call Log 650.

Figure 4:
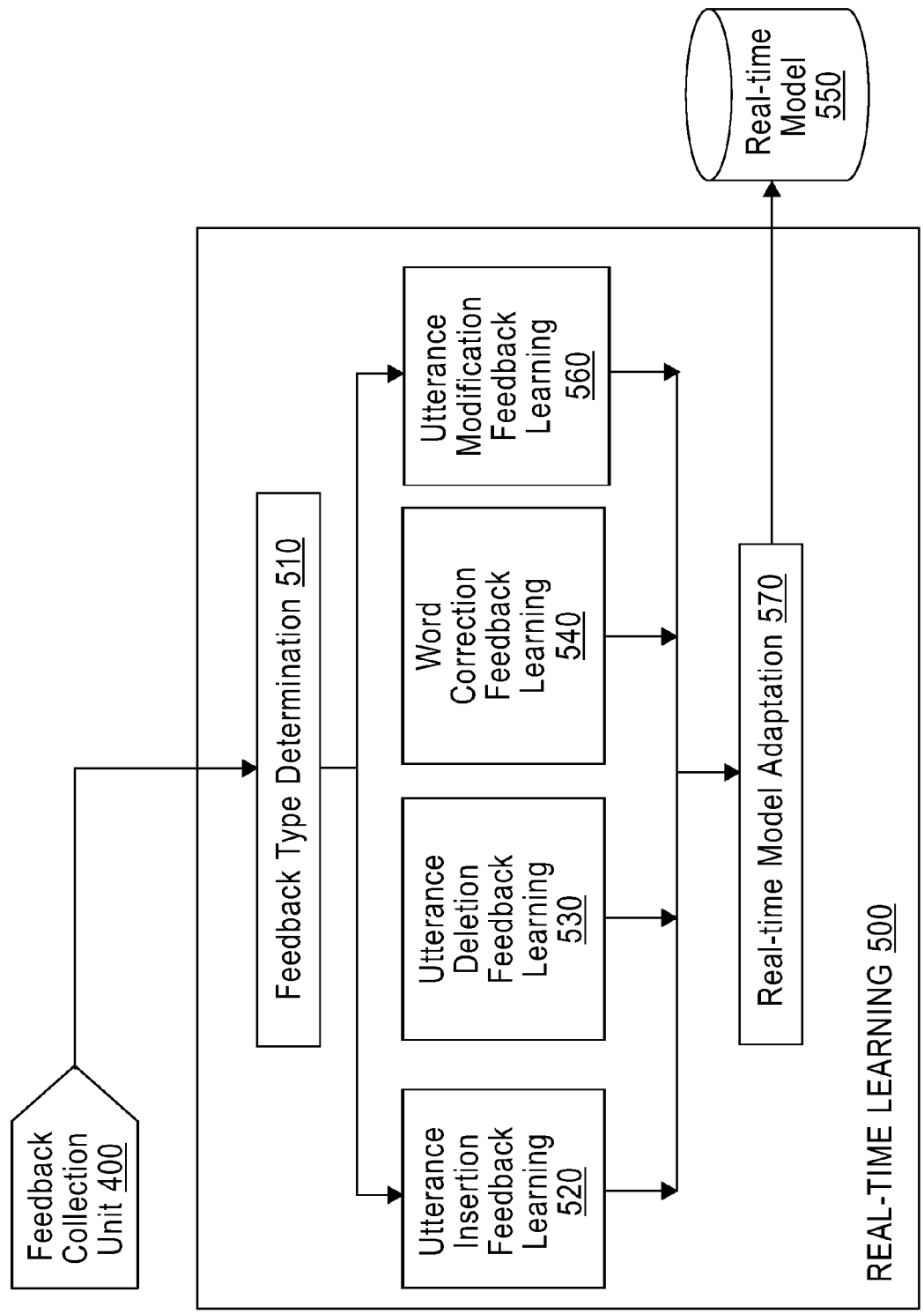
FIG. 4 is a block diagram illustrating representative subcomponents for the Real-time Learning component in accordance with the present invention.

FIG. 4 illustrates the subcomponents of a preferred embodiment of the Real-time Learning component 500 for updating the Real-time models with the agent's feedback. The Real-time Models 550 comprise a set of models used for the current call and are empty at the start of a call. The Real-time Models are built and updated during the current call based on the agent's feedback, providing a personalized adaptation in real-time. Feedback collected by the Feedback Collection component 400 is sent to the Real-Time Learning component 500. Within the Real-time Learning Component, a Feedback Type Determination component 510 decides the type of feedback. In a preferred embodiment, the Feedback Type Determination component checks among the following types: whether an incorrectly recognized word was corrected (i.e., Word Correction feedback), whether a new utterance was added into the call log (i.e., Utterance Insertion feedback), whether an utterance was removed from the call log (i.e., Utterance Deletion feedback), or whether one or more words in an utterance have been inserted, deleted or changed (i.e., Utterance Modification feedback). Depending upon the determined feedback type, an appropriate learning unit is called to process the feedback.

In the preferred embodiment Utterance Insertion feedback is further divided into two categories. The first category includes cases where the newly added utterances exist in the call transcript. The second category is for cases where the newly added utterances don't exist in the call transcript, but are very similar to an existing utterance. The Utterance Insertion Feedback Learning component 520 first finds an utterance in the call transcript which is identical (for the first category) or very similar (for the second category) to the added utterance using any of several phrase distance measures well-known to practitioners of text analysis. For instance, one can use edit distance between two sentences to measure their similarity. It then performs model adaptation using at least one of the following two methods. In a rule-based method, it generates a new call log generation rule from the selected utterance and performs at least one of adding the generated rule in the Global model, if the rule does not exist, and increasing the weight of the rule, if the rule already exists in the Global model. In a machine learning-based method, it performs at least one of: increasing the weight of the utterance in the training set, if it exists in the set, adding the selected utterance as a new learning instance, if it does not exist in the training set, or extracting features from the selected utterance and increasing the weights of the features.

An Utterance Deletion Feedback Learning component 530 performs at least one of: lowering the weight of the rule which generated the removed utterance, removing the rule from the Global Model if the weight falls below a predetermined threshold, lowering the weight of the utterance in the training set, deleting the utterance from the training set if the weight falls below a predetermined threshold, and lowering the weights of features included in the utterance.

A Word Correction Feedback Learning component 540 uses the word correction feedback, (e.g., triples comprising an incorrectly-recognized word by the speech transcription system, a correct word entered by an agent, and the context where the word appears). The word correction feedback information will later be used to replace other instances of the incorrectly-recognized word with the correct word in future call logs. In a preferred embodiment, a context for an instance of the incorrectly-recognized word is compared with the context collected in the feedback. If the two contexts are phonetically or lexically similar, the system replaces the instance of the incorrectly-recognized word with the correct word provided in the feedback.

A further component is the Utterance Modification Feedback Learning component 560. Utterance modification feedback comprises at least one of: adding one or more words in an utterance, deleting one or more words from an utterance, or replacing one or more words with other words or phrases (not including incorrectly-recognized word correction feedback). For instance, a contact center prefers to include a full form (e.g., "International Business Machines") to an acronym (e.g., "IBM") in the call log, and thus the agents replace an acronym in a candidate call log with its full form. The Utterance Modification Feedback Learning component uses the modification feedback to execute the modification to the similar utterances that contain the modified words in future call logs. In a preferred embodiment, it does this by simply replacing all future occurrences of the utterances with the utterance as corrected by the agent feedback. The Real-time models are updated with the results of the learning subcomponents 570.

Figure 5:
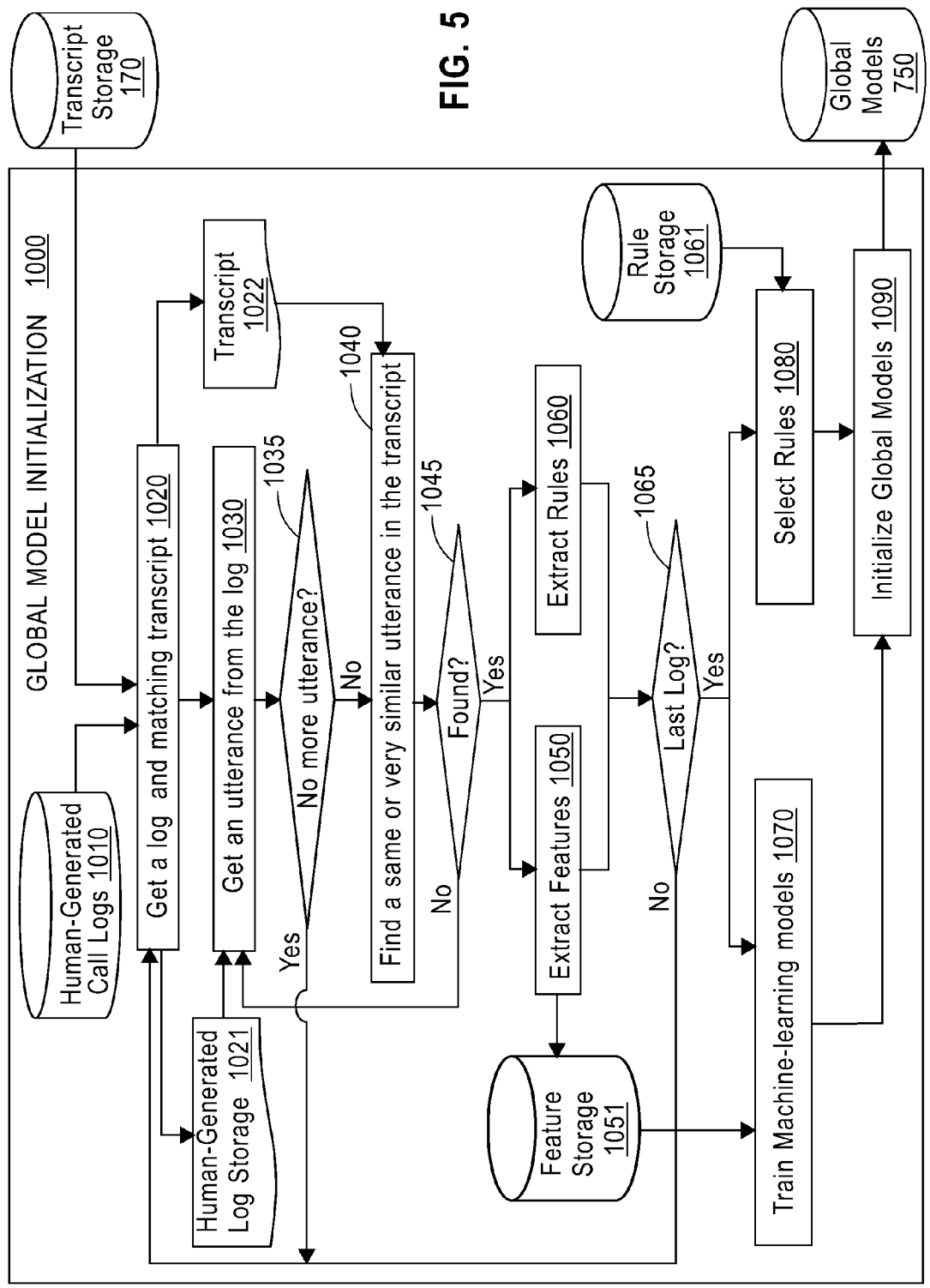
FIG. 5 is a block diagram illustrating representative process flow for the Global Model Initialization component in accordance with the present invention.
Figure 6:
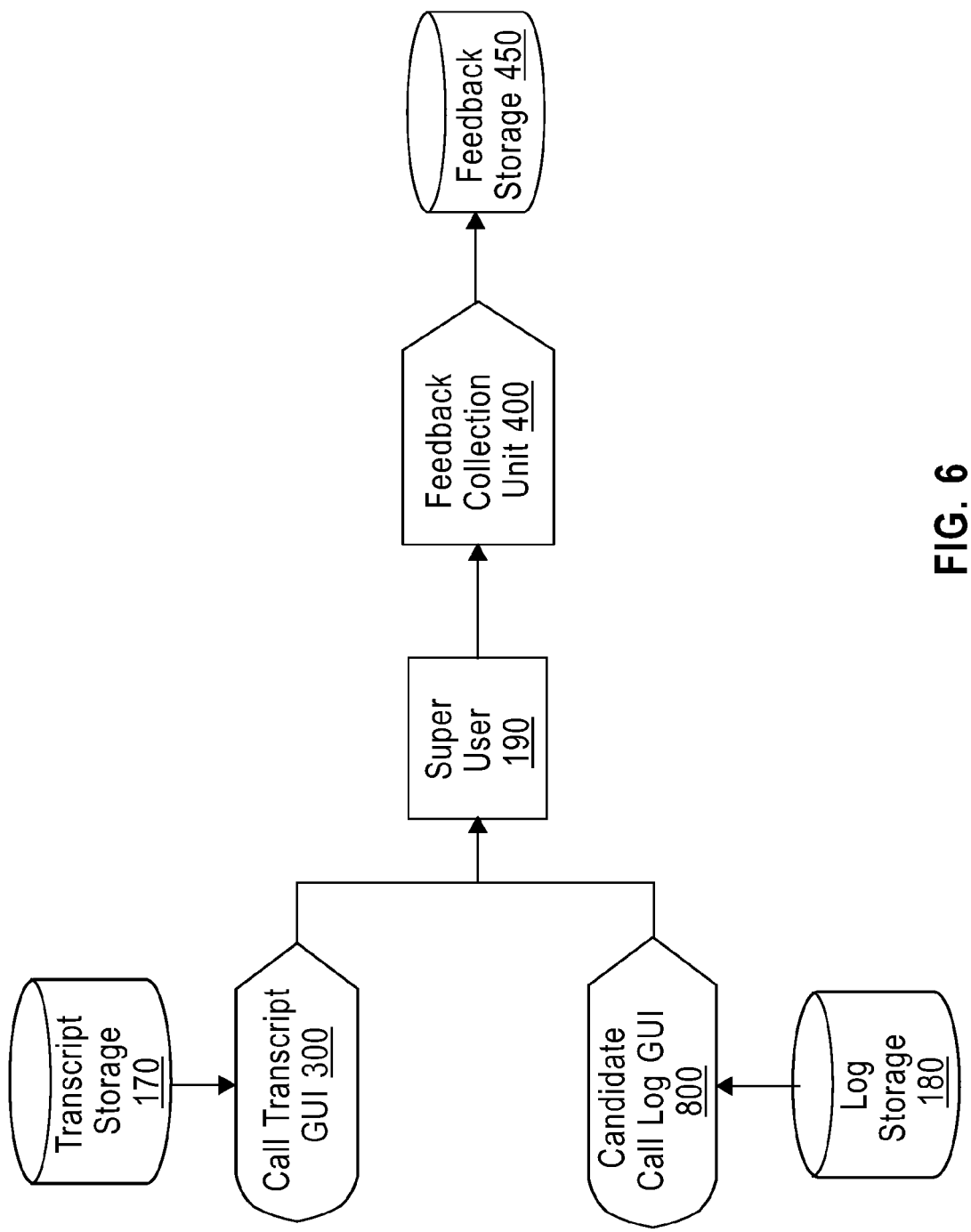
FIG. 6 is a block diagram illustrating representative subcomponents for receiving feedback from super users (e.g., contact center managers) in accordance with the present invention.

The feedback and learning mechanisms for improving the Real-time Models have now been described. Mechanisms for initially populating the Global model and for improving the model are detailed below in FIG. 5, FIG. 6 and FIG. 7. FIG. 5 illustrates the process flow of the Global Model Initialization processing for creating an initial version of the one or more Global Models. An initial set of Global Models can be built either automatically or manually. In a preferred embodiment, a Global Model Initialization component 1000 utilizes a store of human-generated call logs (i.e., good quality logs) and the computer-generated call transcripts corresponding to these logs to learn rules and/or features that the humans used to create the human-generated call logs. A human-generated call log is retrieved at step 1020 from the Human-generated Call Logs Storage 1010 and stored in temporary storage (memory) 1021. The matching call transcript for the log is retrieved from the Transcript Storage 170 and stored in temporary storage (memory) 1022. Each utterance in the call log (hereafter, called a log utterance) is retrieved from temporary storage 1021 at step 1030. If there are no more utterances in the log (i.e., a "yes" determination at step 1035), the process returns to step 1020 for the next call log. If there is an utterance to be analyzed (i.e., a "no" determination at step 1035), an identical or very similar utterance in the transcript in temporary storage 1022, if present, is identified at step 1040. The algorithms for computing the similarity of two utterances are well known to people in the field of natural language processing and text mining. If an identical or very similar utterance is found in the transcript (i.e., a "yes" determination at step 1045), features for a machine learning method are extracted from the utterance at step 1050, and/or a log generation rule is extracted for a rule-based method at step 1060. Features and a log generation rule should contain information that can distinguish log utterances from non-log utterances. In a preferred embodiment, the system extracts information about whether the utterance contains a customer's issue or a product name, whether the utterance is a question statement, whether the utterance contains any cue word or phrase which often appears in log utterances, to name a few. If the transcript does not have any utterance that is similar to the log utterance, the log utterance is discarded. The extracted features and rules are stored in the Feature Storage 1051 and in the Rule Storage 1061, respectively. When all the call logs are analyzed (i.e., a "yes" determination at step 1065), machine learning-based models are trained at step 1070 with the features from the Feature Storage 1051. Call log generation rules with frequency above a predetermined threshold are selected by the Rule Selection component 1080. The initial Global Models are created from the output from the machine learning method and the rule-based method.

In a preferred embodiment of the invention, feedback is provided by the call center agents who handled the customer calls. In another embodiment, illustrated by FIG. 6, super users such as contact center managers and call quality monitors can provide feedback on the computer-generated but human edited logs. In many contact centers, managers periodically select a random sample of calls and perform call monitoring, and one of the facts that managers examine is whether the agent created an appropriate call log. A super user 190 can examine the computer-generated but human edited logs stored in the Log Storage 180 together with the call transcript stored in the Transcript Storage 170, and edit the logs. The feedback by the super user is sent to the Feedback Collection Unit 400 and is stored in the Feedback Storage 450. The feedback from a super user can then be weighted more heavily in the Global Models to reflect the higher expertise of the super users, as described below in FIG. 8.

Figure 7:
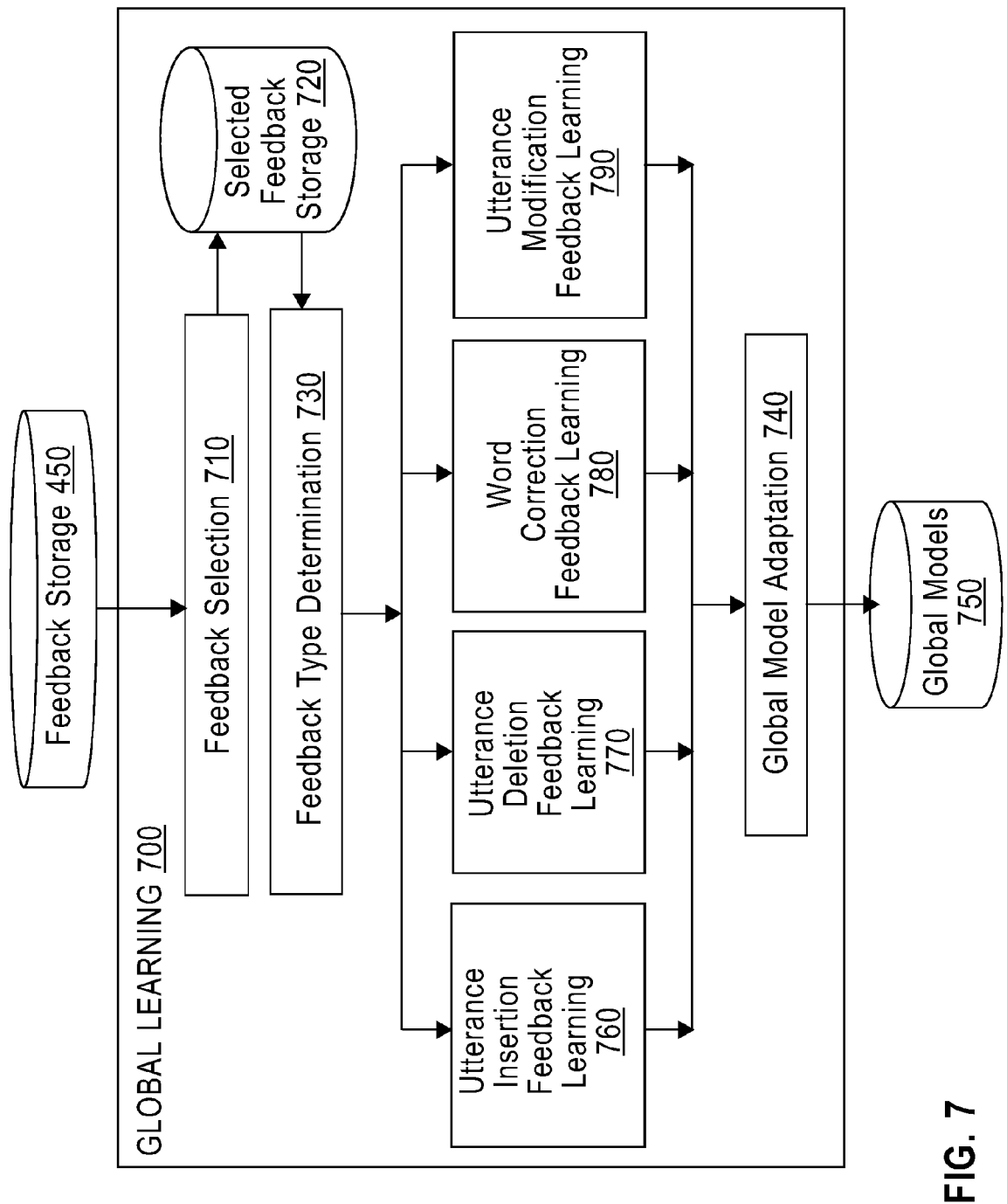
FIG. 7 is a block diagram illustrating representative subcomponents for the Global Learning component in accordance with the present invention.

FIG. 7 illustrates the subcomponents of a preferred embodiment of the Global Learning component 700 for updating the Global Models with feedback provided by a plurality of agents across many calls and/or a plurality of super users. Feedback from a plurality, ideally all, of contact center agents and super users is stored at the Feedback Storage location 450 for analysis by the Global Learning component 700. The stored feedback may be analyzed periodically (e.g., hourly, at close of business each day, etc.) or when a predefined threshold number of agent feedback inputs have been collected or when the contact center needs to update the models due to such reasons as a surge of a new customer issue. A Feedback Selection component 710 examines all available feedback and selects the feedback which will be used to modify the Global Model 750, as will be further detailed below with reference to FIG. 8. All the selected feedback is stored in the Selected Feedback Storage component 720. In a preferred embodiment, the Feedback Type Determination component 730 decides the type of each feedback in the same way as detailed for component 510 in FIG. 4, and the feedback is analyzed in the same was as detailed for components 520, 530, 540 and 560 in FIG. 4 in components 760, 770, 780 and 790, respectively. If there is no more feedback to be analyzed, the Global Models 750 are updated by a Global Model Adaptation component 740.

Figure 8:
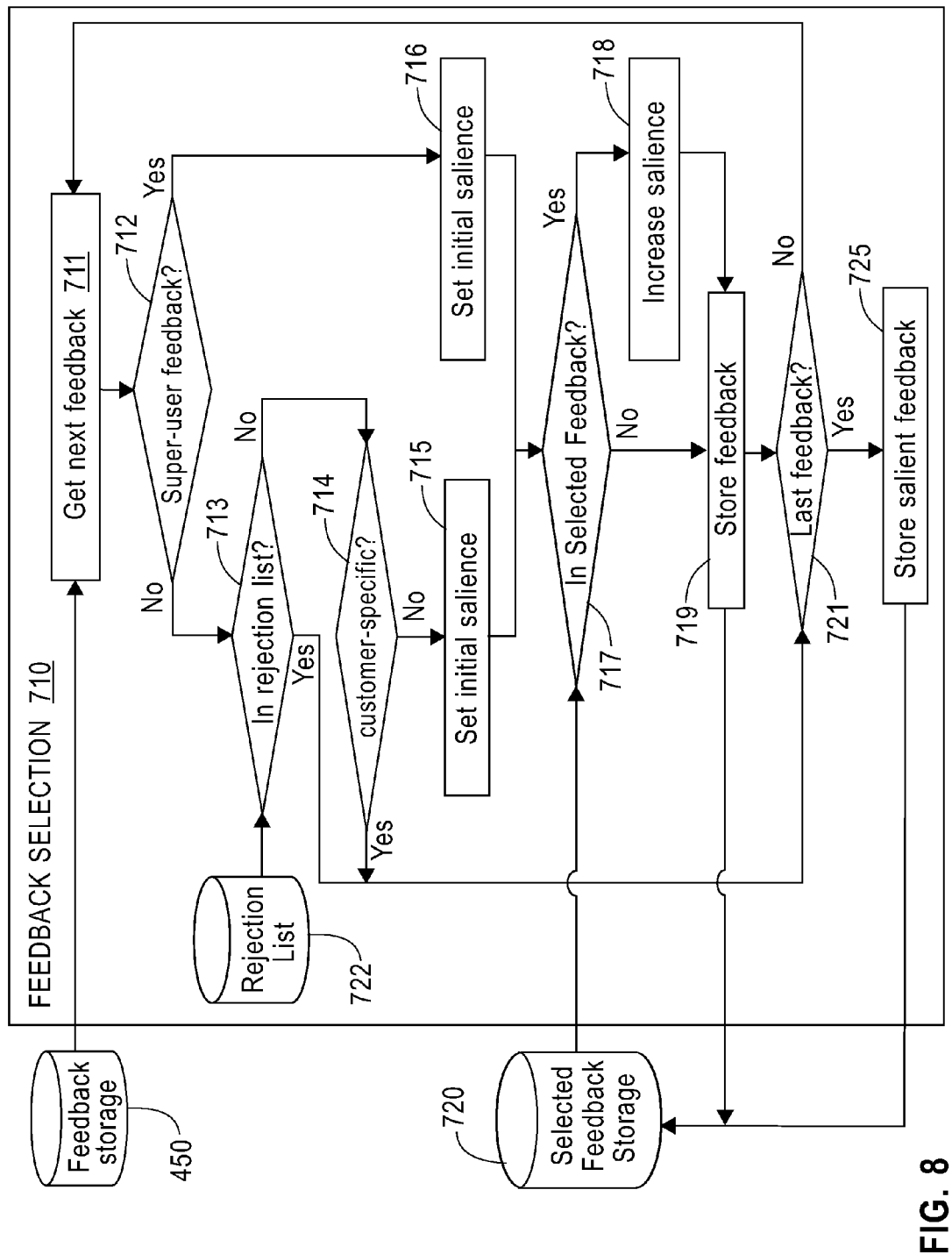
FIG. 8 illustrates a representative process flow for feedback selection in accordance with the present invention.

FIG. 8 illustrates the process flow of the Feedback Selection component 710 from FIG. 7 for determining if feedback is useful for updating the Global Model 770. The Feedback Selection component 710 retrieves feedback at step 711 from the Feedback Storage unit 450. The retrieved feedback is checked to determine if it was created by a super user. In response to a "yes" determination at step 712, the feedback is assigned with the initial salience for super user feedback at step 716. If not (i.e., a "no" at step 712), the feedback is compared to a stored Rejection List 722 at step 713. If the feedback exists in the Rejection List (i.e., a "yes" determination at step 713), the feedback is discarded; i.e., the Reject List provides a mechanism for ignoring certain classes of feedback, if desired. If the feedback is not in the Rejection list (i.e., a "no" determination at step 713), the feedback is analyzed to determine if the feedback is related to customer-specific information at step 714. Examples of customer-specific information include customer's name, telephone number, and address. Customer-specific feedback is discarded because it should not be applied to other customers. If the retrieved feedback is not customer-specific, the feedback is assigned with the initial salience for non-super user feedback at step 715. If the retrieved feedback already exists in the Selected Feedback Storage 720 (i.e., a "yes" at step 717), the salience of the feedback is increased at step 718, and the updated feedback is stored back in the Selected Feedback Storage at step 719; otherwise (i.e., a "no" at step 717) the feedback is simply stored with its initial salience at step 719. The process continues to determine if there is more feedback to be analyzed at step 721. If more feedback exists, the process is repeated. After processing all feedback, the system stores important feedback in the Selected Feedback Storage at step 725. In a preferred embodiment, if the salience (e.g., weight or frequency) of feedback is higher than a predetermined threshold, the feedback is regarded as important.

Figure 9:
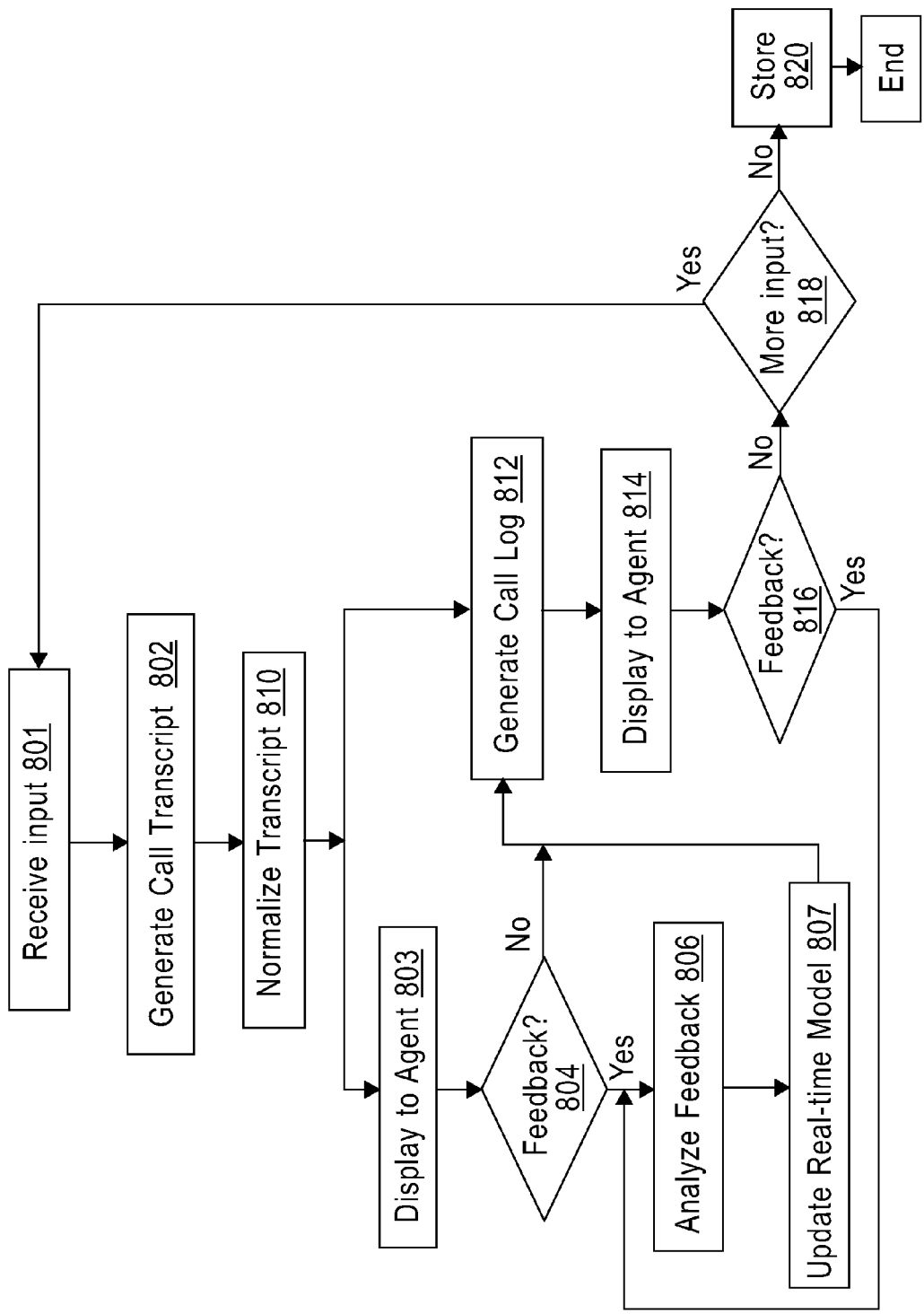
FIG. 9 illustrates a representative real-time process flow for the FIG. 1 system in accordance with the present invention.

FIG. 9 illustrates a representative real-time process flow for implementation by the system of FIG. 1. The system receives input at step 801. As discussed above, spoken input is received from a speech transcription system, but additional textual input can be received from other sources and processed with the text converted from the transcription system. At step 802, the Call Transcript is generated and sent for text normalization at step 810. The normalized text transcript is sent for display to the agent at 803 and for Call Log generation at step 812. The Call Log is sent for display to the agent at 814. In parallel, whether there is any agent feedback to the Call Transcript is determined at step 804. If there is feedback, either implicit or explicit, the feedback is analyzed at step 806, and the Real-time Model is updated at step 807, if needed. If the Real-time Model has been updated, a new Call Log will be generated, returning to step 812, and displayed to the agent at step 814. If there is any agent feedback to the Call Log, as determined at 816, that feedback is analyzed at 806, the Real-time Model updated as needed, and another Call Log generated and displayed. The process iteratively repeats until there is no further feedback, as determined at step 816, and no further inputs to the call transcript as determined at step 818, after which the Call Log is stored at 820 and the process ends.

Figure 10:
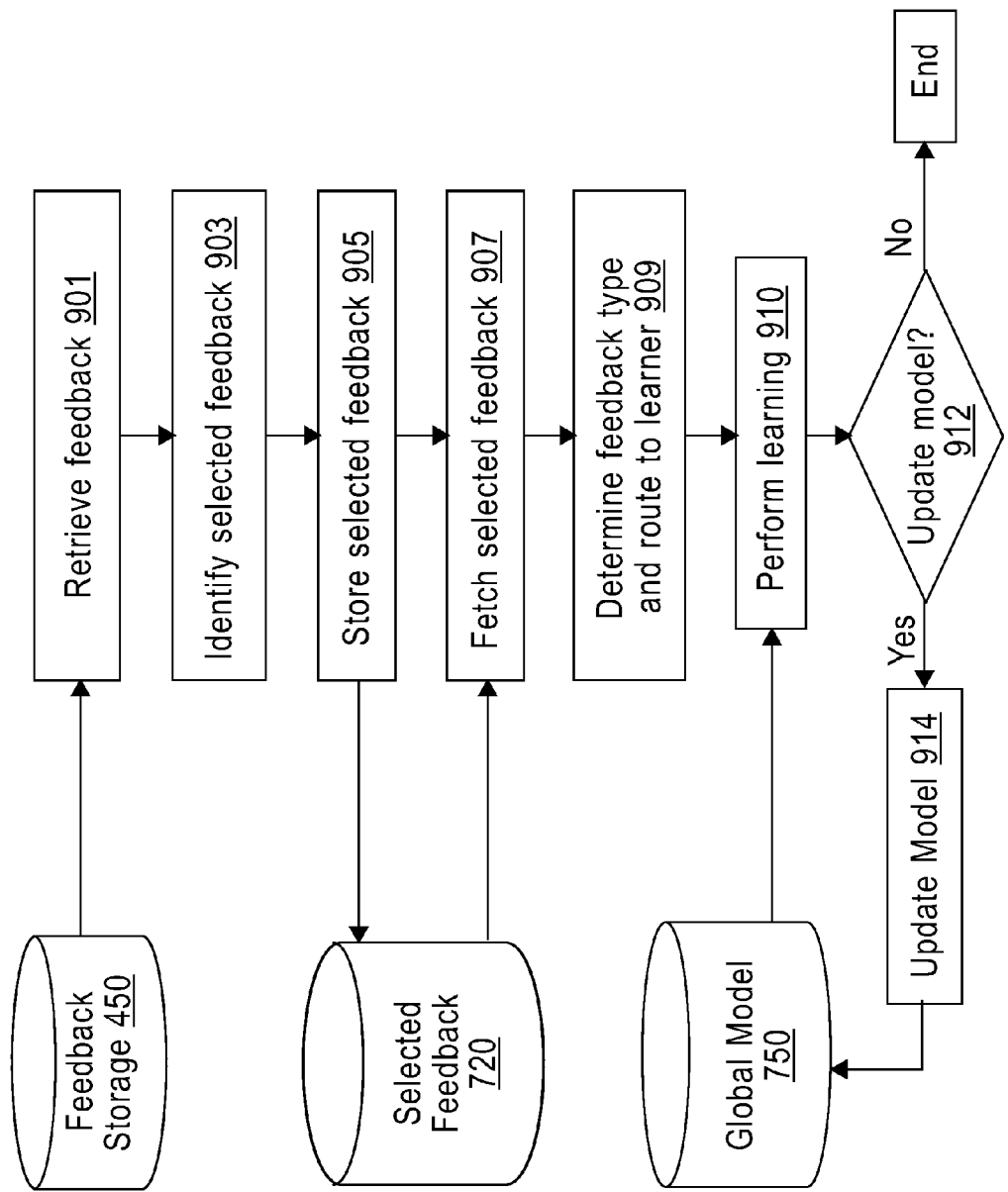
FIG. 10 illustrates a representative process flow of feedback processing by the Global Learning component in accordance with the present invention.

FIG. 10 illustrates a representative process flow of feedback processing by the Global Learning component 700 in accordance with the present invention. Feedback is retrieved from Feedback Storage 450 at step 901. At step 903, selected feedback is identified as described above in FIG. 8 and sent for storage at Selected Feedback Storage unit 720 in step 905. It is to be noted that the selected feedback could be sent for immediate processing if desired. When further processing of the selected feedback is desired, for example when a threshold amount of selected feedback has been stored or upon expiration of a preset time period, the selected feedback is retrieved from storage at step 907. The feedback type is determined and the selected feedback is sent to an appropriate learning component for analysis at step 909. Learning is performed in step 910 at the appropriate learning component (e.g., the Utterance Insertion Feedback Learning component 760, the Utterance Deletion Feedback Learning component 770, or the Utterance Modification Feedback Learning component 780) using the Global Model 750. Based on the output of the appropriate learning component, a determination is made, at 912, as to whether the Global Model needs to be updated. Based on a "yes" determination at step 912, the Global Model is updated at 914 and the results are stored as an updated Global Model 750.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be loaded onto a computer or other programmable data processing apparatus to cause a series of operational steps to be performed on the computer or other programmable apparatus to produce a computer implemented process such that the instructions, when executed on the computer or other programmable apparatus, provide processes for implementing the functions/acts specified in the flowchart and/or block diagram block or blocks.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as heretofore described, may be stored in one or more of the associated storage media (e.g., ROM, fixed or removable storage) and, when ready to be utilized, loaded in whole or in part (e.g., into RAM) and executed by the processor 108. In any case, it is to be appreciated that at least a portion of the components shown in the above figures may be implemented in various forms of hardware, software, or combinations thereof. Given the teachings of the invention provided herein, one of ordinary skill in the art will be able to contemplate other implementations of the components of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

The invention claimed is:

1. A method for a computer apparatus for automatically generating a customer interaction log for an interaction between a customer and agent at a contact center comprising the steps of:

receiving input comprising at least one spoken utterance from said customer and said agent and processing said received input to generate a call transcript;

automatically analyzing said received input comprising analyzing at least said call transcript and, based on results of the analyzing, selecting at least a portion of the received input to generate a customer interaction log using at least one model;

displaying said generated customer interaction log for agent review at a graphical user interface of an agent computer;

receiving agent feedback to the displayed generated customer interaction log at said graphical user interface; and automatically updating said customer interaction log and said at least one model based on said agent feedback.

2. The method of claim 1 wherein said receiving input comprises receiving text from a speech recognition system and may additionally comprise at least one of:

receiving text entered on a Web form;

receiving text of instant messaging; and
receiving text of emails.

3. The method of claim 2 further comprising a step of normalizing said received input by performing at least one of the steps of:
removing disfluencies from said received input;
normalizing vocabulary in said received input;
normalizing alphanumeric characters in said received input;
correcting misspellings or incorrectly recognized words in said received input;
detecting sentence boundaries in said received input;
capitalizing letters in sentences in said received input; and
detecting call segment boundaries in said received input.

4. The method of claim 1 wherein said automatically analyzing the received input to generate a customer interaction log further comprises at least one of:
scoring utterances in received input based on at least one model;
identifying selected utterances to be used in the customer interaction log; and
correcting words in selected utterances.

5. The method of claim 1 further comprising initial creation of said at least one model by at least one of:
manual rule creation; and
machine learning rule creation.

6. The method of claim 1 further comprising analyzing said feedback and updating of said at least one model based on feedback analysis.

7. The method of claim 6 wherein said determining updating comprises comparing an edited customer interaction log edited by the agent to the automatically generated customer interaction log.

8. The method of claim 1 wherein automatically updating said at least one model comprises at least one of:
decreasing the salience of a rule which generated an utterance deleted by the agent;
increasing the salience of a rule which generated an utterance inserted by the agent;
finding a most similar utterance in the received input to a newly created utterance; and
increasing salience of a rule which generated the most similar utterance.

9. The method of claim 1 further comprising storing at least one of the customer interaction log and agent feedback.

10. The method of claim 9 wherein agent feedback is stored for a plurality of interactions between customers and agents and further comprising analyzing said stored feedback and determining updating of a Global Model based on said stored feedback analyzing.

11. The method of claim 1 wherein said customer interaction log is generated with reference to a RealTime Model automatically generated for said interaction.

12. The method of claim 11 wherein said RealTime Model is automatically generated from a Global Model.

13. A system for automatically generating a customer interaction log for an interaction between a customer and agent at a contact center comprising:
at least one processing unit for executing components;
a receiving component for receiving input comprising at least one spoken utterance from the customer and the agent;
a call transcript component for processing received input and generating a call transcript;
an analysis component for automatically analyzing the received input comprising analyzing at least said call transcript and, based on results of the analyzing, selecting at least a portion of the received input to generate a customer interaction log using at least one model;
a display generation component for generating a display of said customer interaction log for agent review at a graphical user interface of an agent computer;
a feedback collection component for receiving agent feedback to the displayed generated customer interaction log; and
at least one learning component for analyzing agent feedback to determine updating of the customer interaction log and said at least one model based on agent feedback.

14. The system of claim 13 further comprising a text normalizing component for transforming received input comprising at least one of:
a disfluency component removing disfluencies from the received text;
a vocabulary normalizing component for normalizing vocabulary in said received text;
a character normalizing component for normalizing alphanumeric characters in said received text;
a word correction component for correcting misspellings or incorrectly recognized words in said received text;
a sentence detection component for detecting sentence boundaries in said received text;
a sentence capitalization component for capitalizing letters in sentences in said received text; and
a call segment component for detecting call segment boundaries in said received text.

15. The system of claim 13 wherein said analysis component comprises at least one subcomponent for performing at least one of:
scoring utterances in received input based on at least one model; and
identifying selected utterances to be used in the customer interaction log.

16. The system of claim 13 further comprising at least one storage component for storing at least one of said at least one models, said customer interaction log, said call transcript, and said agent feedback.

17. The system of claim 13 wherein said analysis component additionally comprises at least one of:
an utterance scoring component for scoring utterances in said call transcript based on at least one of a Global Model and a RealTime Model;
an utterance selection component for identifying selected utterances to be used in said interaction log.

18. The system of claim 16 wherein agent feedback is stored for a plurality of interactions between customers and agents and wherein said at least one learning component analyzes said stored feedback and determines updating of a Global Model based on said stored feedback analyzing.

19. A non-transitory computer-readable medium storing a program of instructions executable by a processing device for performing a method for automatically generating a customer interaction log for an interaction between a customer and agent at a contact center for display to the agent comprising the steps of:
receiving input comprising at least one spoken utterance from the customer and the agent;
processing received input to generate a call transcript;
automatically analyzing the received input comprising analyzing at least said call transcript and, based on results of the analyzing, selecting at least a portion of the received input to generate a customer interaction log using at least one model;
displaying the customer interaction log for agent review at a graphical user interface of an agent computer;

receiving agent feedback to the displayed generated customer interaction log at said graphical user interface; and automatically updating the customer interaction log and said at least one model based on the agent feedback.

* * * * *